United States Patent [19]
Partridge

[11] Patent Number: 5,960,811
[45] Date of Patent: Oct. 5, 1999

[54] SENSING VALVE FOR AUTOMATIC SHUTOFF WHEN A SUBSTANCE IS PRESENT IN A FLOW OF FLUID

[75] Inventor: Jeffrey Michael Partridge, Houston, Tex.

[73] Assignee: Oil State Industries, Inc., Arlingotn, Tex.

[21] Appl. No.: 09/145,664

[22] Filed: Sep. 2, 1998

[51] Int. Cl.⁶ .................................................. F16K 17/14
[52] U.S. Cl. .......................................... 137/68.11; 137/67
[58] Field of Search .................................. 137/68.11, 67, 137/68.18, 74, 75, 456

[56] References Cited

U.S. PATENT DOCUMENTS

| | | | |
|---|---|---|---|
| 3,472,253 | 10/1969 | Herscher et al. | 137/67 |
| 3,491,911 | 1/1970 | Fraylick et al. | 220/26 |
| 3,586,018 | 6/1971 | Bogardh et al. | 137/67 |
| 5,036,875 | 8/1991 | Thiltgen | 137/74 |

OTHER PUBLICATIONS

"CHECK MATE® Hydrocarbon Sensing Valve Installation, Operation & Maintenance Instructions, " HMT Inc., 4422 FM 1960 West, Suite 350, Houston, Texas 77068 (12 pp.).

*Primary Examiner*—David J. Walczak
*Attorney, Agent, or Firm*—Arnold, White & Durkee

[57] ABSTRACT

A sensing valve includes a flow control member and a sensor element responsive to the presence of a substance in a flow of fluid for actuating the flow control member for stopping the flow of fluid when the substance is present in the flow of fluid. The sensing valve has a housing defining an upper region having a generally horizontal flow channel from an inlet port and a lower region having a generally vertical flow channel to an outlet port. The sensor element is disposed in the horizontal flow channel, and the flow control member is disposed in the vertical flow channel. In a preferred construction, the flow control member has a conical surface engaging with a complementary conical surface of a seat, the sensor element is seated on an internal end portion of an inlet pipe, and the sensor element and the flow control member are coupled by a shaft which protrudes from the housing through a gland threaded into the housing. The extent of protrusion of the shaft indicates whether the valve is open or closed. The sensor element can be replaced by unthreading the gland without removal of the shaft or the flow control member. The sensor element, for example, is a polystyrene cylinder that dissolves in the presence of aromatic hydrocarbon.

37 Claims, 4 Drawing Sheets

SENSING VALVE FOR AUTOMATIC SHUTOFF WHEN A SUBSTANCE IS PRESENT IN A FLOW OF FLUID

BACKGROUND OF THE INVENTION

1. Field of the Invention

The present invention relates to a valve that responds to the presence of a particular substance in fluid flowing through the valve, such as the presence of hydrocarbon in a flow of water.

2. Description of the Related Art

In the petroleum industry, it is often possible for hydrocarbon to leak into a flow of water that is discharged into the environment. For example, a hydrocarbon storage tank (such as is found in a "tank farm") often has an internal drain pipe to allow drainage of water from a fixed or floating roof of the tank. It is possible for an internal drain pipe to leak, causing stored hydrocarbon to drain from the tank. To prevent the contents of the tank from being drained to the atmosphere or ground, the discharge end of the drain pipe should be fitted with a hydrocarbon sensing automatic shutoff drain valve.

Hydrocarbon sensing automatic shutoff drain valves are described in Fraylick et al. U.S. Pat. No. 3,491,911 issued Jan. 27, 1970, and Thiltgen U.S. Pat. No. 5,036,875 issued Aug. 6, 1991, incorporated herein by reference. These automatic shutoff drain valves employ a hydrocarbon soluble triggering element disposed in the discharge flow, and a spring that closes the valve upon dissolution of the triggering element. The valves are intended to close in response to a relatively small trickle of water containing hydrocarbon. However, the flow through the open valve should not be unduly restricted or else clogging may occur from debris which are often present in drainage from tank roofs. The valves of Fraylick and Thiltgen have rather complex designs attempting address these problems.

SUMMARY OF THE INVENTION

In accordance with one aspect, the invention provides a sensing valve for shutting off a flow of fluid when a substance is present in the fluid. The sensing valve includes a housing having an inlet port and an outlet port, a shaft having a longitudinal axis, a flow control member, and a sensor element. The shaft is mounted to the housing for translation of the shaft with respect to the housing along the longitudinal axis of the shaft between an open position and a closed position. The flow control member is mounted to the shaft for permitting the flow of fluid from the inlet port to the outlet port when the shaft is in the open position and shutting off the flow of fluid from the inlet port to the outlet port when the shaft is in the closed position. The sensor element is responsive to the presence of the substance in the fluid and coupled between the shaft and the housing so that the shaft moves from the open position to the closed position when the substance is present in the fluid. The housing defines an inlet channel from the inlet port to the shaft for directing the flow of fluid from the inlet port to the shaft in a direction generally perpendicular to the longitudinal axis of the shaft, and an outlet channel from the shaft to an outlet port for directing the flow of fluid from the shaft to the outlet port along a direction generally parallel to the longitudinal axis of the shaft. The sensor element is disposed in the inlet channel, and the flow control member is disposed in the outlet channel.

In accordance with another aspect, the invention provides a sensing valve for shutting off a flow of fluid when a substance is present in the fluid. The sensing valve includes a housing having an inlet port and an outlet port, a shaft having a longitudinal axis, a gland, a flow control member, and a sensor element. The shaft is mounted to the housing for translation of the shaft with respect to the housing along the longitudinal axis of the shaft between an open position and a closed position. The gland is threaded into a hole in the housing for mounting of the shaft to the housing. A portion of the shaft protrudes from the gland when the shaft is in the open position for indicating whether the shaft is in the open position or the closed position. The flow control member is disposed within the housing and mounted to the shaft within the housing for permitting the flow of fluid from the inlet port to the outlet port when the shaft is in the open position and shutting off the flow of fluid from the inlet port to the outlet port when the shaft is in the closed position. The sensor element is mounted within the housing and responsive to the presence of the substance in the fluid and coupled between the shaft and the housing so that the shaft moves from the open position to the closed position when the substance is present in the fluid. The sensor element is removable from the housing by unthreading the gland from the housing and removing the sensor element through the hole in the housing without removal of the shaft or the flow control member from the housing.

In accordance with yet another aspect, the invention provides a sensing valve for shutting off a flow of fluid when a substance is present in the fluid. The sensing valve includes a housing having a cylindrical pipe section about a generally vertical axis, an upper disk section closing an upper end of the cylindrical pipe section, and an inlet pipe section about a generally horizontal axis and intersecting the cylindrical pipe section. The inlet pipe section provides an inlet port for the flow of fluid, and a lower end portion of the cylindrical pipe section provides an outlet port for the flow of fluid. The sensing valve further includes a shaft, a flow control member, and a sensor element. The shaft is mounted to the housing for translation of the shaft with respect to the housing along the vertical axis between an open position and a closed position. The shaft extends through an internal extension of the inlet pipe section and has an upper end portion mounted to the upper disk section. The flow control member is mounted to a lower end portion of the shaft between the internal extension of the inlet pipe section and the outlet port for permitting the flow of fluid from the inlet port to the outlet port when the shaft is in the open position and shutting off the flow of fluid from the inlet port to the outlet port when the shaft is in the closed position. The sensor element is responsive to the presence of the substance in the fluid and is coupled between the shaft and the internal extension of the inlet pipe section so that the shaft moves from the open position to the closed position when the substance is present in the fluid.

In accordance with a final aspect, the invention provides a sensing valve for shutting off a flow of fluid when a substance is present in the fluid. The sensing valve includes a housing having a cylindrical pipe section about a generally vertical axis, an upper disk section closing an upper end of the cylindrical pipe section, and an inlet pipe section about a generally horizontal axis and intersecting the cylindrical pipe section. The inlet pipe section provides an inlet port for the flow of fluid, and a lower end portion of the cylindrical pipe section provides an outlet port for the flow of fluid. The inlet pipe section has an internal end portion within the cylindrical pipe section defining a horizontal inlet flow channel within an upper region within the cylindrical pipe section and defining a vertical outlet flow channel within a lower region of the cylindrical pipe section from the internal end portion of the inlet pipe section to the outlet port. The sensing valve further includes a flow control member and a sensor element. The flow control member is disposed within the lower region within the housing and mounted to the housing for translation in a generally vertical direction between an open position and a closed position. The flow control member permits the flow of fluid from the inlet port to the outlet port when in the open position, and the flow control member stops the flow of fluid from the inlet port to the outlet port when in the closed position. The sensor element is disposed within the upper region with the cylindrical pipe section in the horizontal inlet flow channel and is coupled to the flow control member for actuating movement of the flow control member from the open position to the closed position when the substance is present in the fluid.

BRIEF DESCRIPTION OF THE DRAWINGS

Other objects and advantages of the invention will become apparent upon reading the following detailed description with reference to the accompanying drawings wherein.

Figure 1:
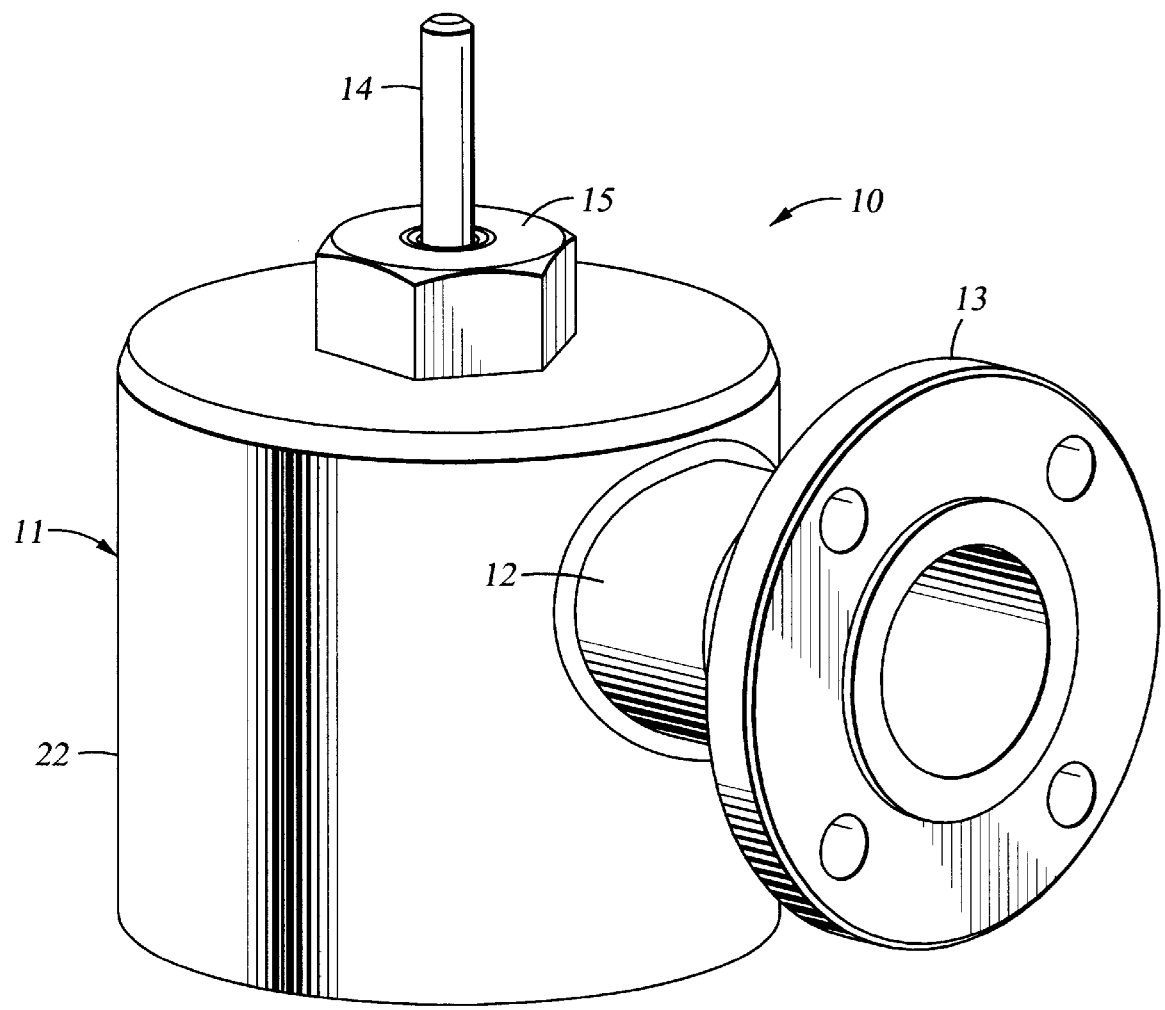
FIG. 1 is a perspective view of a preferred embodiment of a hydrocarbon sensing automatic shutoff drain valve in accordance with the invention.

While the invention is susceptible to various modifications and alternative forms, specific embodiments thereof have been shown by way of example in the drawings and will be described in detail. It should be understood, however, that it is not intended to limit the invention to the particular forms disclosed, but on the contrary, the intention is to cover all modifications, equivalents, and alternatives falling within the scope of the invention as defined by the appended claims.

DESCRIPTION OF ILLUSTRATIVE EMBODIMENTS

With reference to FIG. 1, there is shown a preferred embodiment of a hydrocarbon sensing automatic shutoff drain valve 10 in accordance with the present invention. The valve 10 has a valve body 11 including a cylindrical pipe section 22 and an inlet pipe 12 extending generally normal to the cylindrical pipe section 22. The inlet pipe 12 is terminated with a conventional flange 13 for bolting the valve 10 to a discharge end of a drain pipe (not shown). A shaft 14 coaxial with the cylindrical pipe section 22 protrudes from a gland 15 that screws into the upper portion of the valve body 11.

The extent of protrusion of the shaft 14 from the top of the gland 15 provides a visual indication of whether the valve 10 is open or closed. FIG. 1 shows the extent of the shaft 14 when the valve 10 is in its fully open condition. The shaft 14 extends only slightly from the top of the gland 15 when the valve 10 is in its closed condition.

Figure 2:
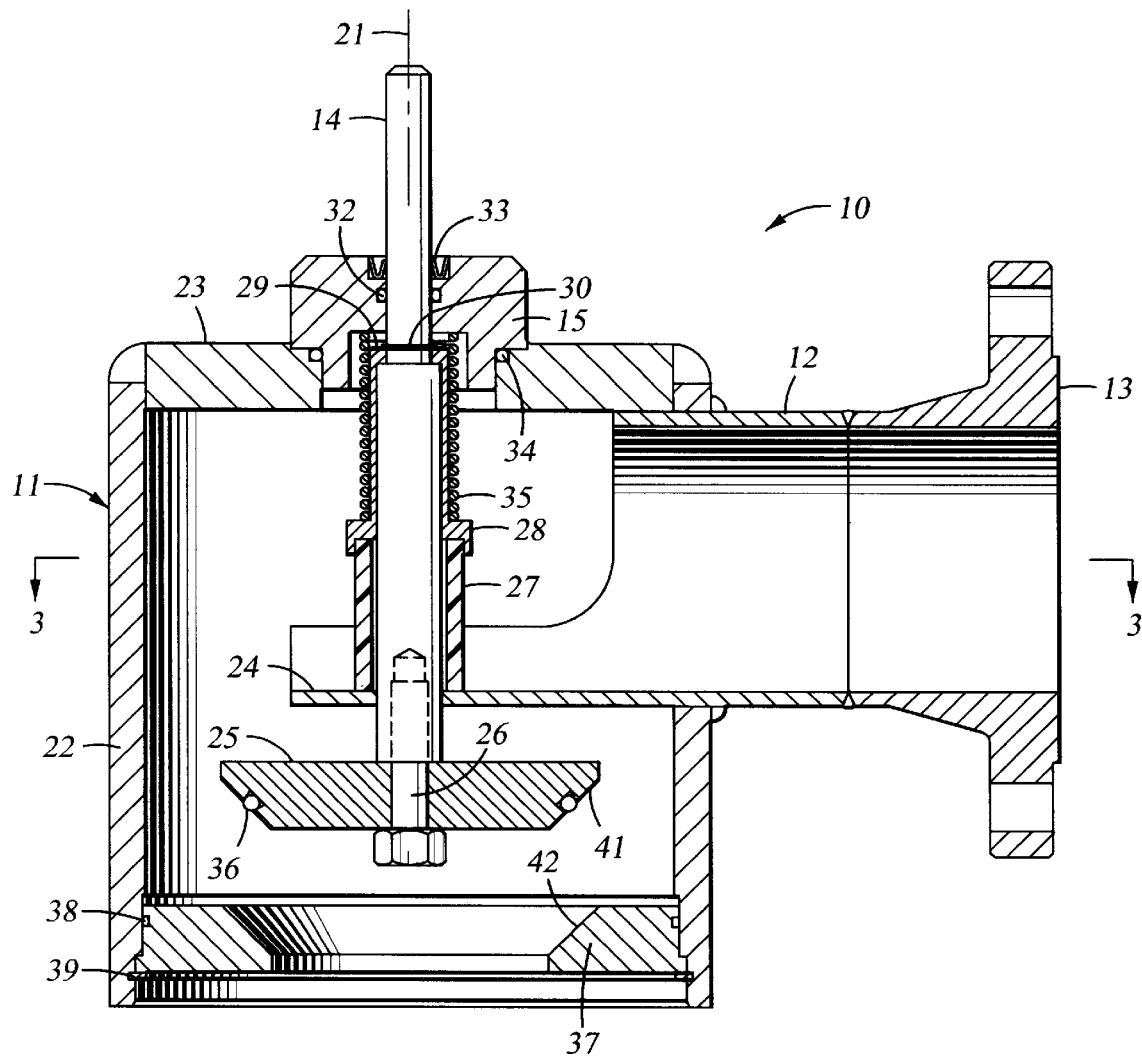
FIG. 2 is a lateral cross-section view of the hydrocarbon sensing automatic shutoff valve of FIG. 1.

FIG. 2 shows a cross-section of the drain valve 10 with respect to a plane including the axis 21 of the cylindrical pipe section 22 and the axis of the inlet pipe 12 along the section line 3—3. The valve body 11 is a steel weldment including the cylindrical pipe section 22, an upper disk 23, the inlet pipe 12, and the flange 13. Alternatively, the portion of the valve body 11 made by welding the upper disk 23 to the cylindrical pipe section 22 could be cast as a homogeneous structure. The inlet pipe 12 is fitted into a cylindrical hole bored into the cylindrical pipe section 22, and then welded to the cylindrical pipe section. An internal end portion 24 of the inlet pipe 12 is formed by cutting away an upper portion of the inlet pipe so that the internal end portion 24 may support a clapper assembly including the shaft 14, a clapper 25 secured by a threaded self-sealing screw 26 to a lower end portion of the shaft 14, a hydrocarbon sensing cylinder 27, a spring guide 28, a washer 29, and an industrial retaining ring 30.

Figure 3:
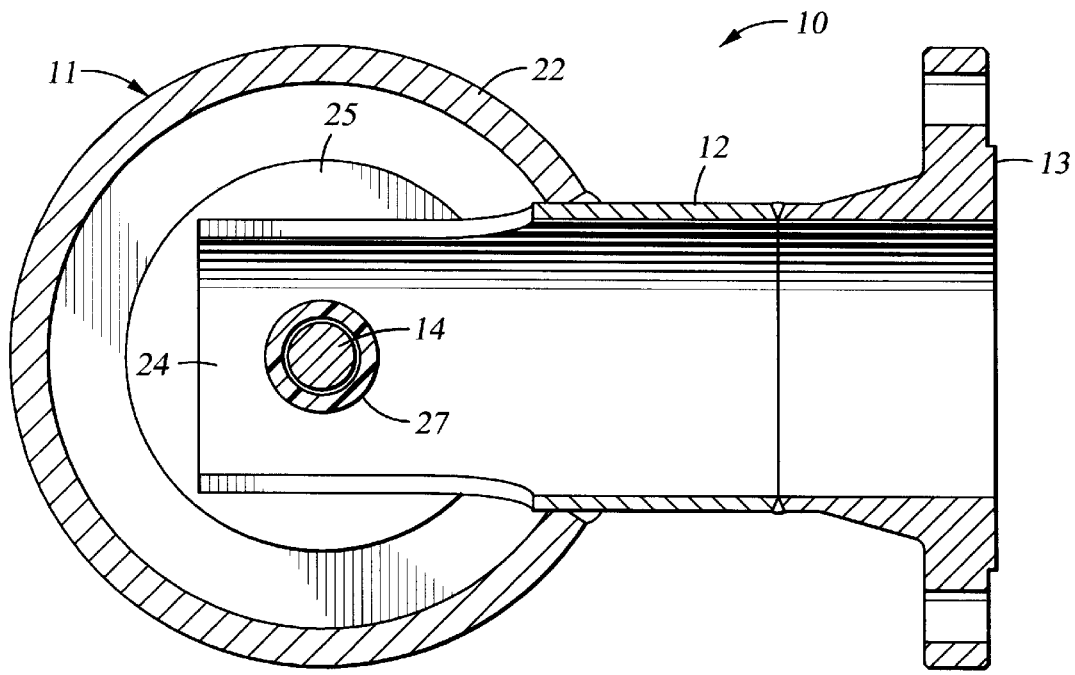
FIG. 3 is a cross-section view of the hydrocarbon sensing automatic shutoff valve of FIG. 2 along line 3—3 in FIG. 2.

The shape of the internal end portion 24 of the inlet pipe 12 is further illustrated in FIG. 3, which shows a top view of the internal end portion 24 of the inlet pipe.

Figure 4:
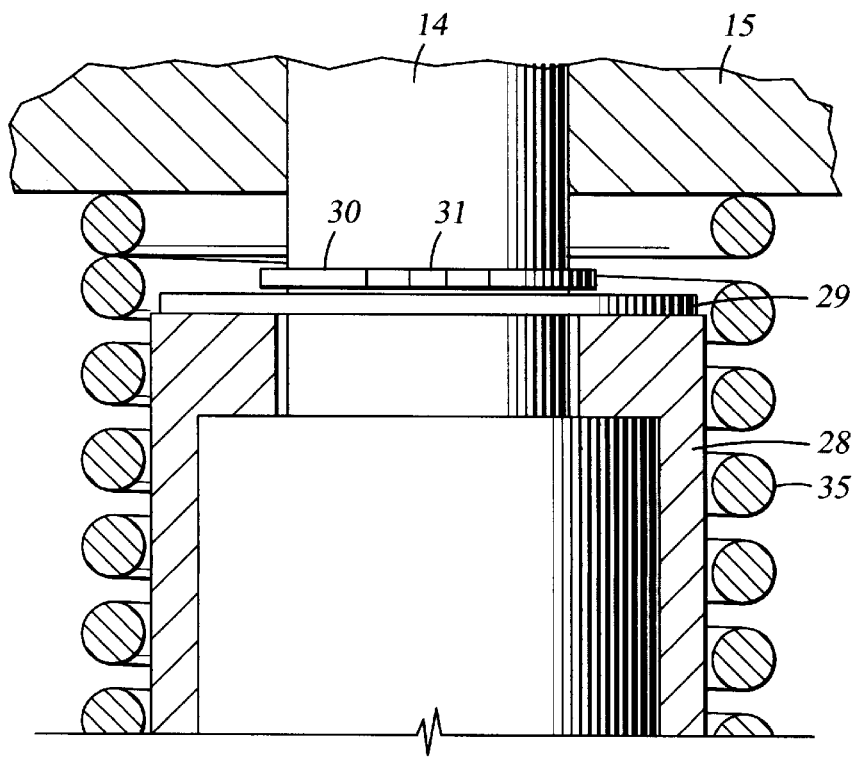
FIG. 4 is an expanded view from a region in FIG. 2 more clearly showing a washer and an industrial retaining ring.

The washer 29 and industrial retaining ring 30 are more clearly seen in FIG. 4. The industrial retaining ring 30 has a conventional construction and snaps into an annular groove 31 machined into the shaft 14.

Returning to FIG. 2, an O-ring 32 and a Parker Seal-Loc wiper 33 seal the shaft 14 with respect to the gland 15. The gland 15 is threaded into the upper disk 23 of the valve body weldment 11. An O-ring 34 seals the gland 15 with respect to the upper disk 23.

In order to assist closure of the drain valve 10 when the discharge stream includes hydrocarbons, a compression spring 35 is disposed between the spring guide 28 and the gland 15. In a typical use of the drain valve 10, the inlet pipe 12 is generally horizontal, and the axis 21 of the valve body 11 is generally vertical. The internal end portion 24 of the inlet pipe provides a horizontal discharge stream into which the hydrocarbon sensor element 27 is disposed. The sensor element 27, for example, is a Styrofoam (polystyrene foam) cylinder that dissolves or is considerably weakened by the presence of aromatic hydrocarbons. The cylindrical shape of the internal end portion 24 of the inlet pipe will guide the slightest trickle of a discharge stream against the lower portion of the sensor element 27, so that the sensor element will dissolve or be considerably weakened by the presence of hydrocarbon in the discharge stream. Since the internal end portion 24 of the inlet pipe 12 is formed by cutting away a sizable portion of the inlet pipe, the sensor element 27 does not substantially impede a full-bore discharge stream or cause a problem of clogging when debris are present in the discharge stream. However, such a full-bore discharge stream is also directed by the inlet pipe 12 against the sensor element 27 so that the sensor element will be rapidly dissolved or considerably weakened by the presence of hydrocarbon in the full-bore discharge stream.

As the sensor element 27 dissolves, gravity and the force of the compression spring 35 cause the shaft 14 to lower the clapper 25 until the clapper engages a seat 37 at the lower end portion of the cylindrical pipe section 22. The clapper 25 functions as a flow control member. Once the clapper engages the seat 37, flow through the valve is stopped. The seat 37 is oriented in a vertical flow channel and the clapper 25 and the seat 37 have adjacent complementary 45 degree conical surfaces 41, 42, respectively. This orientation and taper tend to prevent a build-up of debris which could clog the valve. The conical surface 41 of the clapper 25 is formed with a groove to retain an O-ring 36 that seals the clapper with respect to the seat 37 when the valve 10 is in its closed state. An O-ring 38 seals the seat 37 with respect to the lower end portion of the cylindrical pipe section 22. A Smalley snap ring 39 is received in an annular groove in the lower end portion of the cylindrical pipe section 22 in order to retain the seat 37 in the cylindrical pipe section.

To assemble the drain valve 10 during the manufacturing process, the clapper 25 including the O-ring 36 is fastened to the shaft 14 by the screw 26. Then the shaft 14 is inserted into the lower end of the cylindrical valve body 11 and up through the internal end portion 24 of the inlet pipe 12 at a time when the seat 37 and the gland 15 are not assembled with the cylindrical valve body 11. Next the hydrocarbon sensor cylinder 27 is slipped over the top end portion of the shaft 14. Then the spring guide 28 is slipped over the upper end portion of the shaft 14 and into engagement with the upper end portion of the hydrocarbon sensor cylinder 27. Then the washer 29 is slipped over the upper end portion of the shaft 14. Then the industrial retaining ring 30 is slipped over the upper end portion of the shaft 14 and engaged with the annular groove 31 (see FIG. 4) so that the clapper assembly is supported by the internal end portion 24 of the inlet pipe 12. Then the compression spring 35 is slipped over the upper end portion of the shaft 14 and over the spring guide 28. Then the gland 15 is slipped over the upper end potion of the shaft 14 and screwed into the upper disk 23 of the valve body 11. Then the seat 37 including the O-ring 38 is inserted into the lower end portion of the cylindrical pipe section 22 of the valve body 11. Finally, the snap ring 39 is inserted into the annular internal groove of the lower end portion of the cylindrical pipe section 22 to retain the seat 37.

When the hydrocarbon sensor cylinder 27 dissolves due to a leak of hydrocarbon into the discharge stream, the drain valve 10 closes. The closed condition of the drain valve is indicated by the lowered position of the upper end portion of the shaft 14 with respect to the top of the gland 15. The closed condition is observed by a maintenance person, who repairs the leak of hydrocarbon into the discharge stream. Once the leak has been fixed, a replacement hydrocarbon sensor element is installed without removal of the seat 37 or disassembly of the clapper 25 from the shaft 14.

To enable the replacement sensor element to be placed about the shaft 14, the gland 15 is unscrewed from the upper disk 23 of the valve body 11, and removed from the shaft 14 along with the compression spring 35. Removal of the gland 15 allows the pressure in the valve body 11 to be released in a controlled manner. Then the industrial retaining ring 30 is removed from the annular slot 31 (see FIG. 4) of the shaft 14 so that the washer 29 and spring guide 28 can also be removed from the shaft. The lower portion of the spring guide 28 is formed to crimp the upper portion of the used hydrocarbon sensor element, so as to facilitate removal of any undissolved portion of the used hydrocarbon sensor element. The replacement hydrocarbon sensor element can then be crimped into the spring guide 28, and together with the spring guide 28 slipped over the upper end portion of the shaft 14 and down onto the internal end portion 24 of the inlet pipe 12. Then the washer 29 is slipped over the upper end portion of the shaft 14. Then the industrial retaining ring 30 is slipped over the upper end portion of the shaft 14 and engaged with the annular groove 31 (see FIG. 4) in the shaft so that the clapper assembly is supported by the internal end portion 24 of the inlet pipe 12. Then the compression spring 35 is slipped over the upper end portion of the shaft 14 and over the spring guide 28. Then the gland 15 is slipped over the upper end potion of the shaft 14 and screwed into the upper disk 23 of the valve body 11.

It should be apparent that the hydrocarbon sensing automatic drain valve 10 has a relatively simple construction yet can be triggered by a trickle of discharge containing hydrocarbons in such a way as to avoid clogging from debris in the discharge stream. By placing the sensor element 27 in the flow stream and in contact with even the slightest flow from the inlet pipe 12, closure on a trickle leak is obtained. The vertical 45 degree seat 37 also improves reliability by preventing debris buildup and interference with the clapper. The reduced number of moving parts also leads to increased reliability. The open or closed condition of the valve is visually indicated, and the hydrocarbon sensor element is easily replaced, without requiring the inlet of the valve to be disconnected from the source of the discharge stream.

The preferred construction of the drain valve 10 as shown in the drawings can also be modified to suit a particular environment in which is intended to be used. For example, instead of welding the inlet pipe 12 to a flange connector 13, the inlet pipe 12 could be welded directly to a discharge pipe (not shown) from a tank (not shown), or welded directly to the outlet port of a shut-off valve (not shown), such as a manually-operated gate valve, placed between the discharge pipe from the tank and the inlet pipe 12 of the automatic drain valve 10. Moreover, the automatic drain valve 10 as shown in the drawing figures is intended to discharge the stream from the seat 37 into a holding pond (not shown) associated with a tank, but the seat 37 or the lower end portion of the cylindrical pipe section 22 of the valve body 11 could be configured for directing the discharge stream from the seat 37 into a discharge conduit such as a pipe or hose. Such a downstream connection could be made without requiring removal of the automatic drain valve.

Figure 5:
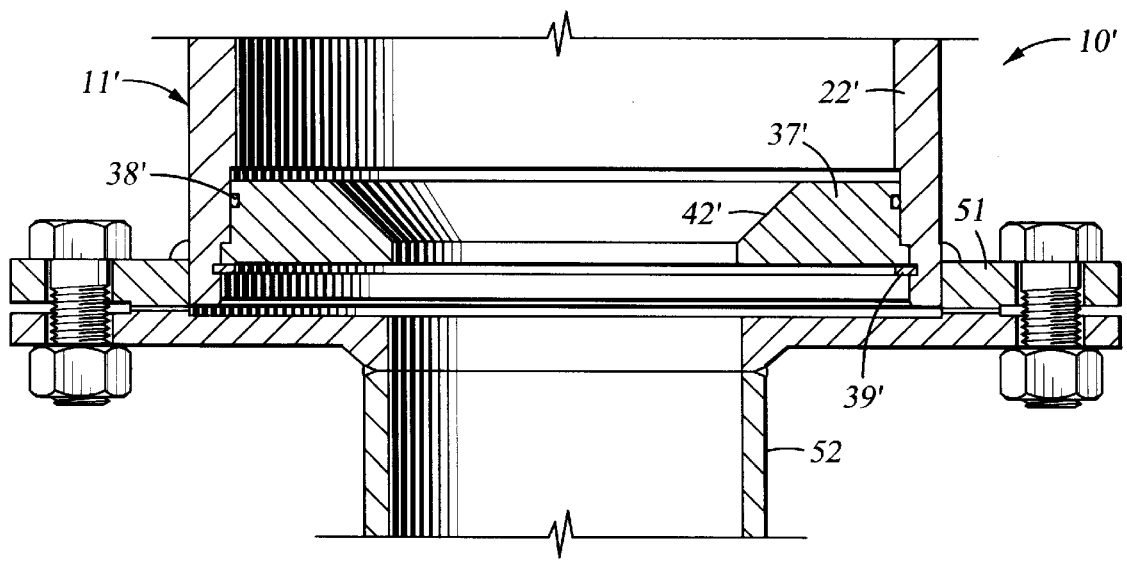
FIG. 5 shows an alternative construction in which a valve body has a lower flange for coupling a hydrocarbon sensing automatic shutoff valve to an outlet pipe.

FIG. 5, for example, shows an alternative construction having a flange 51 welded to the lower end portion of a valve body 11' for bolting a drain valve 10' to an outlet pipe 52. Components in FIG. 5 that are similar to components in FIG. 2 are shown with similar but primed reference numerals.

Figure 6:
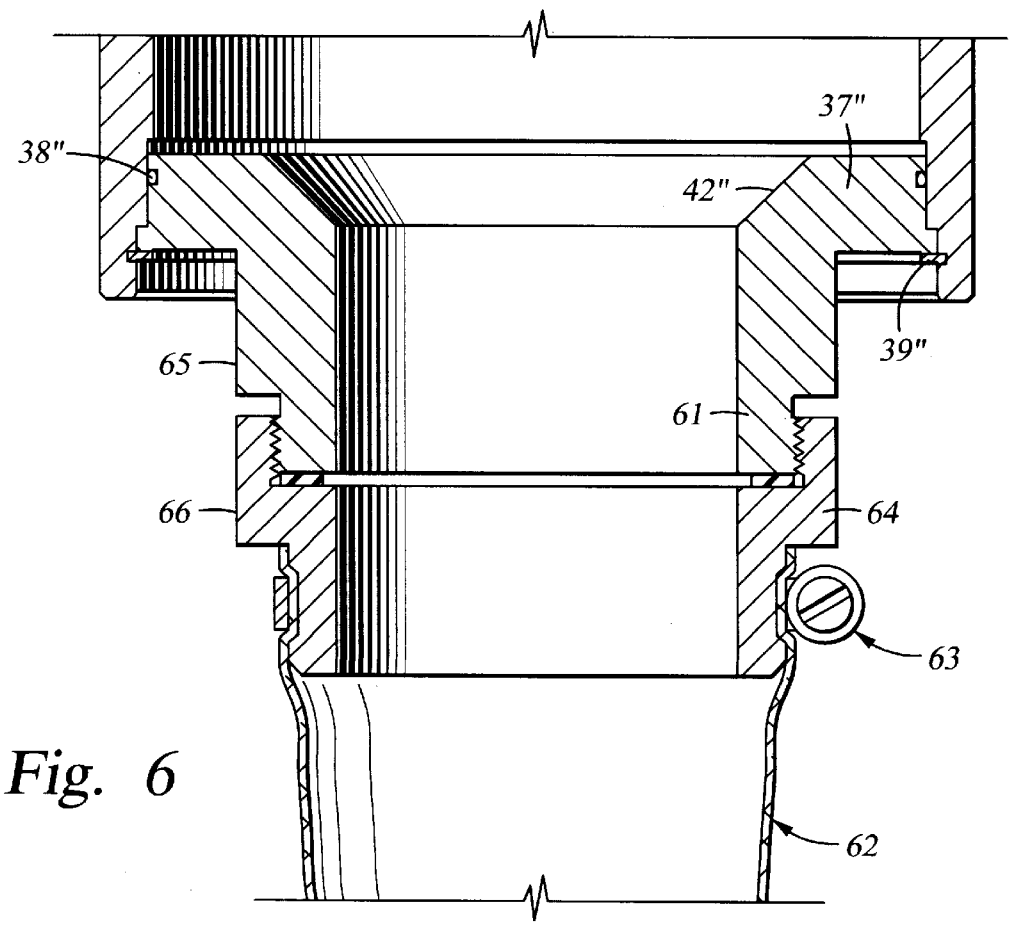
FIG. 6 shows an alternative construction in which the seat of a hydrocarbon sensing automatic shutoff valve has a threaded extension for coupling to an outlet hose.

FIG. 6, for example, shows another alternative construction in which the lower portion of a seat 37" is formed with a threaded extension 61 for connecting the seat to an outlet hose 62. Components in FIG. 5 that are similar to components in FIG. 2 are shown with similar but double-primed reference numerals. A hose clamp 63 clamps the hose 62 to a threaded female coupler 64 which mates with the threaded extension 61. The outer periphery of the threaded extension 61 and the threaded female coupler 64 are provided with respective flats 65, 66 for the tightening and loosening of the threaded female coupler 64 with the threaded extension 62.

What is claimed is:

1. A sensing valve for shutting off a flow of fluid when a substance is present in the fluid, the sensing valve comprising:

a housing having an inlet port and an outlet port;

a shaft having a longitudinal axis and mounted to the housing for translation of the shaft with respect to the housing along the longitudinal axis of the shaft between an open position and a closed position;

a flow control member mounted to the shaft for permitting the flow of fluid from the inlet port to the outlet port when the shaft is in the open position and shutting off the flow of fluid from the inlet port to the outlet port when the shaft is in the closed position; and a sensor element responsive to the presence of the substance in the fluid and coupled between the shaft and the housing so that the shaft moves from the open position to the closed position when the substance is present in the fluid;

wherein the housing defines an inlet channel from the inlet port to the shaft for directing the flow of fluid from the inlet port to the shaft in a direction generally perpendicular to the longitudinal axis of the shaft, and an outlet channel from the shaft to an outlet port for directing the flow of fluid from the shaft to the outlet port along a direction generally parallel to the longitudinal axis of the shaft; and the sensor element is disposed in the inlet channel, and the flow control member is disposed in the outlet channel.

2. The sensing valve as claimed in claim 1, wherein the housing includes a cylindrical pipe section about a generally vertical axis, an upper disk section closing an upper end of the cylindrical pipe section, an inlet pipe section about a generally horizontal axis and intersecting the cylindrical pipe section, the inlet pipe section providing the inlet port for the flow of fluid, and the outlet port being located at a lower end portion of the cylindrical pipe section.

3. The sensing valve as claimed in claim 1, wherein movement of the shaft from the open position to the closed position is assisted by the force of gravity.

4. The sensing valve as claimed in claim 1, which further includes a compression spring wrapped around the shaft for moving the shaft from the open position to the closed position.

5. The sensing valve as claimed in claim 4, wherein the sensor element is a hollow cylinder that slips over the shaft, and further including a spring guide which slips over the shaft between the compression spring and the sensor element.

6. The sensing valve as claimed in claim 5, further including a removable retaining ring engaging the shaft for retaining the spring guide on the shaft.

7. The sensing valve as claimed in claim 1, wherein a portion of the shaft protrudes from the housing when the shaft is in the open position to indicate whether the shaft is in the open position or the closed position.

8. The sensing valve as claimed in claim 1, wherein the flow control member has a conical surface which engages a complementary conical surface of a seat about the outlet channel for stopping the flow of fluid when the shaft is in the closed position.

9. The sensing valve as claimed in claim 1, wherein the sensor element is soluble in the presence of aromatic hydrocarbon so that the shaft moves from the open position to the closed position when aromatic hydrocarbon is present in the fluid flow.

10. The sensing valve as claimed in claim 1, wherein the sensor element is replaceable without removal of the shaft or flow control member from the housing.

11. The sensing valve as claimed in claim 1, wherein the sensor element is disposed in the inlet channel to be in contact with the slightest trickle of the fluid flow without any pooling of the fluid within the housing and to respond to the presence of the substance in the slightest trickle of the fluid flow for moving the shaft from the open position to the closed position.

12. The sensing valve as claimed in claim 1, further including a connector mounted to the housing at the outlet port for connecting the sensing valve to a discharge conduit.

13. A sensing valve for shutting off a flow of fluid when a substance is present in the fluid, the sensing valve comprising:

a housing having an inlet port and an outlet port;

a shaft having a longitudinal axis and mounted to the housing for translation of the shaft with respect to the housing along the longitudinal axis of the shaft between an open position and a closed position;

a gland threaded into a hole in the housing for mounting of the shaft to the housing, a portion of the shaft protruding from the gland when the shaft is in the open position for indicating whether the shaft is in the open position or the closed position;

a flow control member disposed within the housing and mounted to the shaft within the housing for permitting the flow of fluid from the inlet port to the outlet port when the shaft is in the open position and shutting off the flow of fluid from the inlet port to the outlet port when the shaft is in the closed position; and a sensor element mounted within the housing and responsive to the presence of the substance in the fluid and coupled between the shaft and the housing so that the shaft moves from the open position to the closed position when the substance is present in the fluid;

wherein the sensor element is removable from the housing by unthreading the gland from the housing and removing the sensor element through the hole in the housing without removal of the shaft or the flow control member from the housing.

14. The sensing valve as claimed in claim 13, wherein the housing defines an inlet channel from the inlet port to the shaft for directing the flow of fluid from the inlet port to the shaft in a direction generally perpendicular to the longitudinal axis of the shaft, and an outlet channel from the shaft to an outlet port for directing the flow of fluid from the shaft to the outlet port along a direction generally parallel to the longitudinal axis of the shaft; and the sensor element is disposed in the inlet channel, and the flow control member is disposed in the outlet channel.

15. The sensing valve as claimed in claim 14, wherein the housing includes a cylindrical pipe section about a generally vertical axis, an upper disk section closing an upper end of the cylindrical pipe section, and an inlet pipe section about a generally horizontal axis and intersecting the cylindrical pipe section, and wherein the inlet pipe section provides the inlet port for the flow of fluid, and the outlet port is located at a lower end portion of the cylindrical pipe section.

16. The sensing valve as claimed in claim 13, wherein movement of the shaft from the open position to the closed position is assisted by the force of gravity.

17. The sensing valve as claimed in claim 13, which further includes a compression spring wrapped around the shaft for moving the shaft from the open position to the closed position.

18. The sensing valve as claimed in claim 17, wherein the sensor element is a hollow cylinder that slips over the shaft, and further including a spring guide that slips over the shaft between the compression spring and the sensor element.

19. The sensing valve as claimed in claim 18, further including a removable retaining ring engaging the shaft for retaining the spring guide on the shaft.

20. The sensing valve as claimed in claim 14, wherein the flow control member has a conical surface which engages a complementary conical surface of a seat about the outlet channel for stopping the flow of fluid when the shaft is in the closed position.

21. The sensing valve as claimed in claim 13, wherein the sensor element is soluble in the presence of aromatic hydrocarbon so that the shaft moves from the open position to the closed position when aromatic hydrocarbon is present in the fluid flow.

22. The sensing valve as claimed in claim 13, wherein the sensor element is disposed in the housing to be in contact with the slightest trickle of the fluid flow without any pooling of the fluid within the housing and to respond to the presence of the substance in the slightest trickle of the fluid flow for moving the shaft from the open position to the closed position.

23. The sensing valve as claimed in claim 13, which further includes a connector mounted to the housing at the outlet port for connecting the sensing valve to a discharge conduit.

24. A sensing valve for shutting off a flow of fluid when a substance is present in the fluid, the sensing valve comprising:
   a housing having a cylindrical pipe section about a generally vertical axis, an upper disk section closing an upper end of the cylindrical pipe section, and an inlet pipe section about a generally horizontal axis and intersecting the cylindrical pipe section, the inlet pipe section providing an inlet port for the flow of fluid, and a lower end portion of the cylindrical pipe section providing an outlet port for the flow of fluid;
   a shaft having a longitudinal axis and mounted to the housing for translation of the shaft with respect to the housing along the vertical axis between an open position and a closed position, the shaft extending through an internal extension of the inlet pipe section and having an upper end portion mounted to the upper disk section;
   a flow control member mounted to a lower end portion of the shaft between the internal extension of the inlet pipe section and the outlet port for permitting the flow of fluid from the inlet port to the outlet port when the shaft is in the open position and shutting off the flow of fluid from the inlet port to the outlet port when the shaft is in the closed position; and
   a sensor element responsive to the presence of the substance in the fluid and coupled between the shaft and the internal extension of the inlet pipe section so that the shaft moves from the open position to the closed position when the substance is present in the fluid.

25. The sensing valve as claimed in claim 24, which further includes a compression spring wrapped around the shaft and disposed between the upper disk section and the sensor element for moving the shaft from the open position to the closed position.

26. The sensing valve as claimed in claim 25, wherein the sensor element is a hollow cylinder that slips over the shaft, and further including a spring guide which slips over the shaft between the compression spring and the sensor element.

27. The sensing valve as claimed in claim 26, further including a removable retaining ring engaging the shaft for retaining the spring guide on the shaft.

28. The sensing valve as claimed in claim 24, which further includes a gland threaded into a hole in the upper disk section of housing, and wherein an upper end portion of the shaft extends through the gland to protrude from the housing when the shaft is in the open position to indicate whether the shaft is in the open position or the closed position, and wherein the sensor element is replaceable through the hole without removal of the shaft or the flow control member from the housing after unthreading of the gland from the upper disk section of the housing.

29. The sensing valve as claimed in claim 24, wherein the flow control member has a conical surface which engages a complementary conical surface of a seat about the outlet port for stopping the flow of fluid when the shaft is in the closed position.

30. The sensing valve as claimed in claim 24, wherein the sensor element is soluble in the presence of aromatic hydrocarbon so that the shaft moves from the open position to the closed position when aromatic hydrocarbon is present in the fluid flow.

31. The sensing valve as claimed in claim 24, wherein the internal extension of the inlet pipe section is formed by cutting out an upper end portion of the inlet pipe section so that the sensor element is seated in a lower end portion of the inlet pipe section to be in contact with the slightest trickle of the fluid flow without any pooling of the fluid within the housing and to respond to the presence of the substance in the slightest trickle of the fluid flow for moving the shaft from the open position to the closed position.

32. The sensing valve as claimed in claim 24, further including a connector mounted to the housing at the outlet port for connecting the sensing valve to a discharge conduit.

33. A sensing valve for shutting off a flow of fluid when a substance is present in the fluid, the sensing valve comprising:
   a housing having a cylindrical pipe section about a generally vertical axis, an upper disk section closing an upper end of the cylindrical pipe section, and an inlet pipe section about a generally horizontal axis and intersecting the cylindrical pipe section, the inlet pipe section providing an inlet port for the flow of fluid, and a lower end portion of the cylindrical pipe section providing an outlet port for the flow of fluid, the inlet pipe section having an internal end portion within the cylindrical pipe section defining a horizontal inlet flow channel within an upper region within the cylindrical pipe section and wherein said housing further defines a vertical outlet flow channel within a lower region of the cylindrical pipe section from the internal end portion of the inlet pipe section to the outlet port;
   a flow control member disposed within the lower region within the housing and mounted to the housing for translation in a generally vertical direction between an open position and a closed position, the flow control member permitting the flow of fluid from the inlet port to the outlet port when in the open position, and the flow control member stopping the flow of fluid from the inlet port to the outlet port when in the closed position; and
   a sensor element disposed within the upper region with the cylindrical pipe section in the horizontal inlet flow channel and coupled to the flow control member for actuating movement of the flow control member from the open position to the closed position when the substance is present in the fluid.

34. The sensing valve as claimed in claim 33, wherein the flow control member has a conical surface which engages a complementary conical surface of a seat about the outlet port for stopping the flow of fluid when the flow control member is in the closed position.

35. The sensing valve as claimed in claim 33, wherein the sensor element is soluble in the presence of aromatic hydrocarbon so that the flow control member moves from the open position to the closed position when aromatic hydrocarbon is present in the fluid flow.

36. The sensing valve as claimed in claim 33, wherein the internal end portion of the inlet pipe section is formed by cutting out an upper end portion of the inlet pipe section and the sensor element is seated on the internal end portion of the inlet pipe section so that the sensor element is in contact with the slightest trickle of the fluid flow without any pooling of the fluid within the housing and to respond to the presence of the substance in the slightest trickle of the fluid flow for moving the flow control member from the open position to the closed position.

37. The sensing valve as claimed in claim 33, further including a connector mounted to the housing at the outlet port for connecting the sensing valve to a discharge conduit.

* * * * *